United States Patent
Seff et al.

(10) Patent No.: US 10,158,221 B2
(45) Date of Patent: Dec. 18, 2018

(54) VEHICLE OR MARINA POWER PEDESTAL INCLUDING GROUND FAULT INDICATOR

(71) Applicant: EATON CORPORATION, Cleveland, OH (US)

(72) Inventors: Paul D. Seff, Williamsburg, VA (US); Christopher E. Drueke, Lansing, MI (US); Jason D. Easton, Williamsburg, VA (US); Tyler Devon Young, Yorktown, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/508,617

(22) PCT Filed: Aug. 8, 2015

(86) PCT No.: PCT/US2015/045608
§ 371 (c)(1),
(2) Date: Mar. 3, 2017

(87) PCT Pub. No.: WO2016/069093
PCT Pub. Date: May 6, 2016

(65) Prior Publication Data
US 2017/0250532 A1 Aug. 31, 2017

Related U.S. Application Data

(60) Provisional application No. 62/072,043, filed on Oct. 29, 2014.

(51) Int. Cl.
*H02H 3/16* (2006.01)
*H02B 1/50* (2006.01)
(Continued)

(52) U.S. Cl.
CPC .................. *H02H 3/16* (2013.01); *G08B 5/36* (2013.01); *H02B 1/04* (2013.01); *H02B 1/26* (2013.01);
(Continued)

(58) Field of Classification Search
CPC .......... H02H 1/0015; H02H 3/16–3/17; H04B 10/502; G08B 5/36; H05B 33/0872;
(Continued)

(56) References Cited

U.S. PATENT DOCUMENTS 4,077,056 A * 2/1978 Galiana .................. H02H 3/162
361/50
4,519,657 A * 5/1985 Jensen ..................... H02B 1/50
174/38
(Continued)

FOREIGN PATENT DOCUMENTS

WO 81/02495 A1 9/1981

OTHER PUBLICATIONS

European Patent Office, "International Search Report and Written Opinion", PCT/US2015/045608, dated Oct. 23, 2015, 8 pp.

*Primary Examiner* — Zachary Pape
(74) *Attorney, Agent, or Firm* — Eckert Seamans

(57) ABSTRACT

A power pedestal includes a pedestal member including a base structured to be fixed to a platform and an enclosure extending from said base, a plurality of input power terminals mounted to said pedestal member and structured to be electrically connected to a power source, a number of output power receptacles mounted to said enclosure, a number of circuit interrupters having a ground fault detection capability and being structured to output an alarm signal in response to detecting a ground fault, a relay structured to receive the alarm signal from the circuit interrupters and to output an indicator signal, and an indicator unit structured to receive
(Continued)

the indicator signal from the relay, the indicator unit including an indicator and being structured to illuminate the indicator in response to receiving the indicator signal.

11 Claims, 4 Drawing Sheets

(51) Int. Cl.
  *G08B 5/36* (2006.01)
  *H02B 1/04* (2006.01)
  *H02B 1/26* (2006.01)
  *H04B 10/50* (2013.01)
  *H05B 33/08* (2006.01)

(52) U.S. Cl.
  CPC ............ *H02B 1/50* (2013.01); *H04B 10/502* (2013.01); *H05B 33/0872* (2013.01)

(58) Field of Classification Search
  CPC . H02B 1/26; H02B 1/04; H02B 1/011; H01H 73/14
  USPC .......................................................... 361/42
  See application file for complete search history.

(56) References Cited

U.S. PATENT DOCUMENTS

| | | | |
|---|---|---|---|
| 5,184,279 A | 2/1993 | Horn | |
| 5,611,616 A | 3/1997 | Chandler | |
| 8,085,516 B1* | 12/2011 | Armstrong | H02H 3/335 |
| | | | 361/42 |
| 2007/0242154 A1* | 10/2007 | Cope | H04M 1/22 |
| | | | 348/370 |
| 2008/0224622 A1* | 9/2008 | Hsu | H05B 33/0821 |
| | | | 315/185 R |
| 2008/0253061 A1* | 10/2008 | Seff | H02B 1/50 |
| | | | 361/622 |
| 2009/0042621 A1* | 2/2009 | Wingett | F21V 9/40 |
| | | | 455/567 |
| 2014/0020925 A1 | 1/2014 | Seff et al. | |
| 2017/0169685 A1* | 6/2017 | Easton | G08B 21/02 |
| 2017/0179691 A1* | 6/2017 | Easton | H02B 1/50 |
| 2017/0227979 A1* | 8/2017 | Drueke | G05F 5/00 |
| 2017/0237251 A1* | 8/2017 | Easton | H02H 3/16 |
| | | | 361/42 |

\* cited by examiner

VEHICLE OR MARINA POWER PEDESTAL INCLUDING GROUND FAULT INDICATOR

CROSS-REFERENCE TO RELATED APPLICATIONS

This application claims priority from and claims the benefit of U.S. Provisional Patent Application Ser. No. 62/072,043, filed Oct. 29, 2014, which is incorporated by reference herein.

BACKGROUND

Field of the Invention

The disclosed concept pertains generally to power pedestals and, more particularly, to vehicle or marina power pedestals.

Background Information

U.S. Pat. No. 6,844,716 discloses a utility distribution pedestal for marine and recreational vehicles. However, known power pedestals do not provide an obvious indication that a ground fault has occurred with respect to receptacles located in the power pedestal. As a result, users of such power pedestals may not know that a ground fault has occurred until or after they approach and attempt to plug a device into the power pedestal.

There is room for improvement in vehicle or marina power pedestals.

SUMMARY

These needs and others are met by embodiments of the disclosed concept wherein a power pedestal includes and indicator that illuminates in response to a ground fault being detected.

In accordance with one aspect of the disclosed concept, a power pedestal comprises: a pedestal member comprising: a base structured to be fixed to a platform, and an enclosure extending from said base; a plurality of input power terminals mounted to said pedestal member and structured to be electrically connected to a power source; a number of output power receptacles mounted to said enclosure; a number of circuit interrupters having a ground fault detection capability and being structured to output an alarm signal in response to detecting a ground fault; a relay structured to receive the alarm signal from the circuit interrupters and to output an indicator signal; and an indicator unit structured to receive the indicator signal from the relay, the indicator unit including an indicator and being structured to illuminate the indicator in response to receiving the indicator signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the term "number" shall mean one or an integer greater than one (i.e., a plurality).

As employed herein, the term "platform" shall mean a horizontal flat surface, a raised horizontal flat surface, or a dock pier.

As employed herein, the term "pedestal" or "pedestal member" shall mean an elongated, generally upright structure.

As employed herein, the term "power pedestal" shall mean a pedestal or pedestal member structured to input power from input power terminals (e.g., utility power terminals) and output power to a number of output power receptacles.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a marina power pedestal, although the disclosed concept is applicable to a wide range of vehicle power pedestals.

Figure 1:
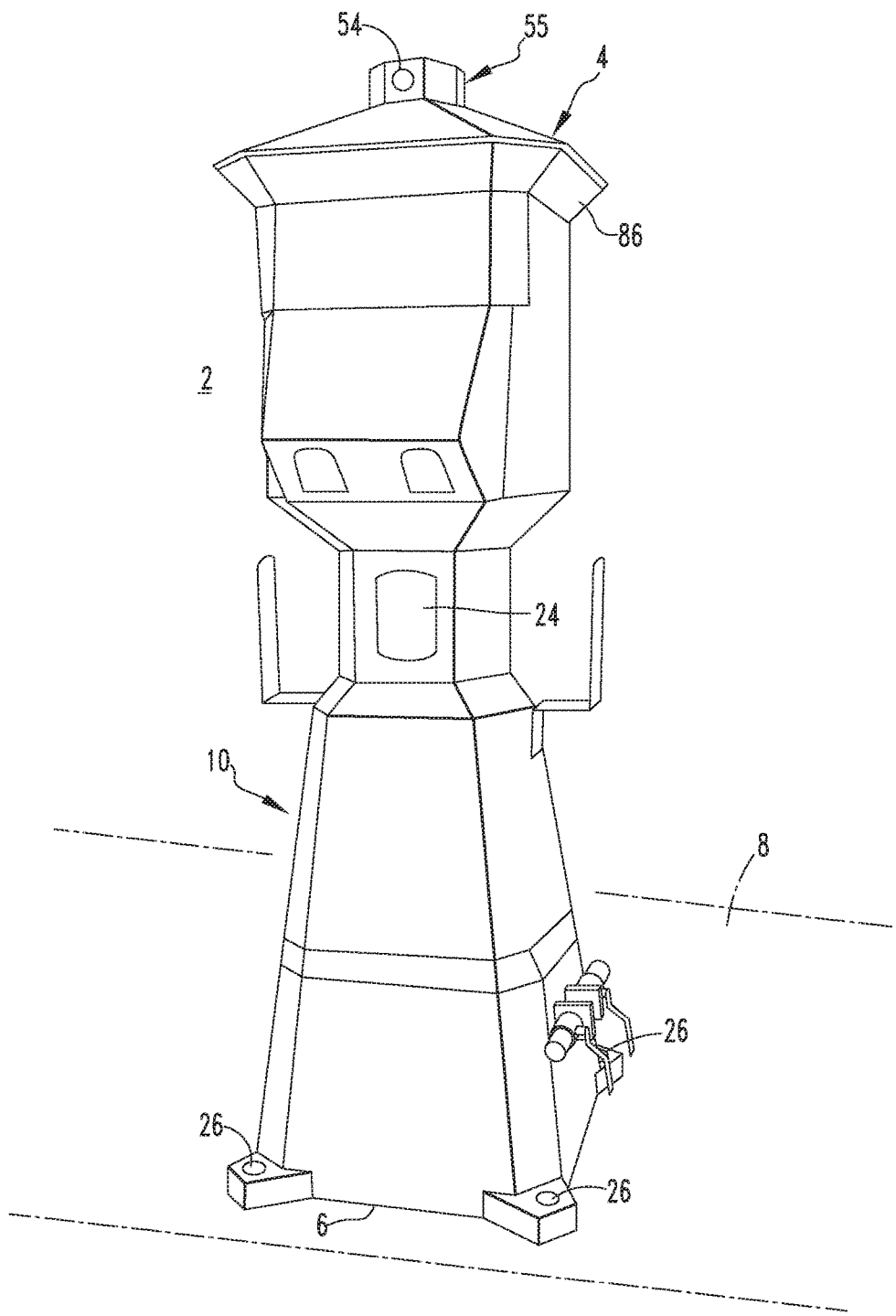
FIG. 1 is an isometric view of a marina power pedestal in accordance with embodiments of the disclosed concept.

Referring to FIG. 1, a power pedestal, such as, for example and without limitation, a marina power pedestal 2 includes a pedestal member 4 having a base 6 structured to be fixed to a platform, such as, for example and without limitation, a dock pier 8 (shown in phantom line drawing) and an enclosure 10 extending generally vertically from the base 6. A plurality of input power terminals 12 (shown, in FIGS. 3 and 4) are mounted to the pedestal member 4 and are structured to be electrically connected to a power source (e.g., a utility power source) (not shown) by plural electrical conductors 14 (shown in FIG. 2). The marina power pedestal 2 also includes a number of output power receptacles 16 (shown in FIGS. 3 and 4) mounted to the enclosure 10.

Figure 3:
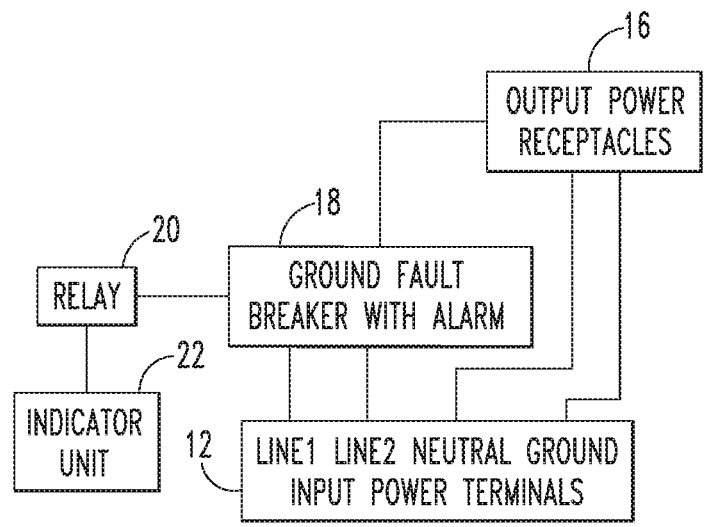
FIG. 3 is a schematic diagram of a ground fault indicator circuit in accordance with embodiments of the disclosed concept.
Figure 4:
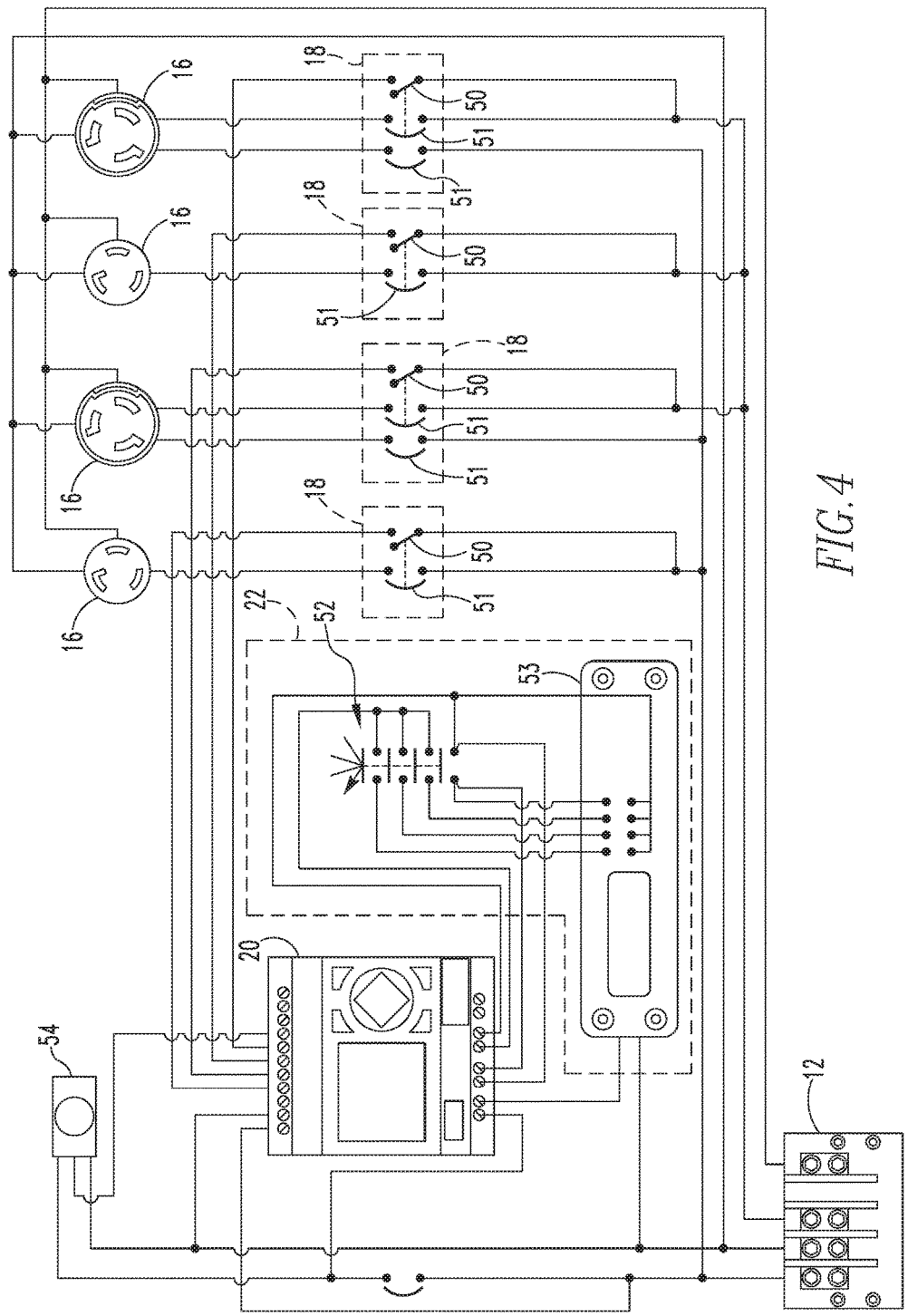
FIG. 4 is a circuit diagram of a ground fault indicator circuit in accordance with embodiments of the disclosed concept.

The marina power pedestal 2 further includes a number of circuit interrupters, such as, for example and without limitation, circuit breakers 18 having a ground fault circuit interruption capability (shown in FIGS. 3 and 4).

Although a dock pier 8 is disclosed, the platform may be any suitable platform, such as a concrete platform member at a recreational vehicle (RV) park. Thus, the power pedestal 2 may be a vehicle (e.g., without limitation, RV) power pedestal. The power pedestal base 6 includes a plurality of openings 26 structured to receive a plurality of fasteners (not shown) to fix the base 6 to the example dock pier 8 or other suitable platform.

Figure 2:
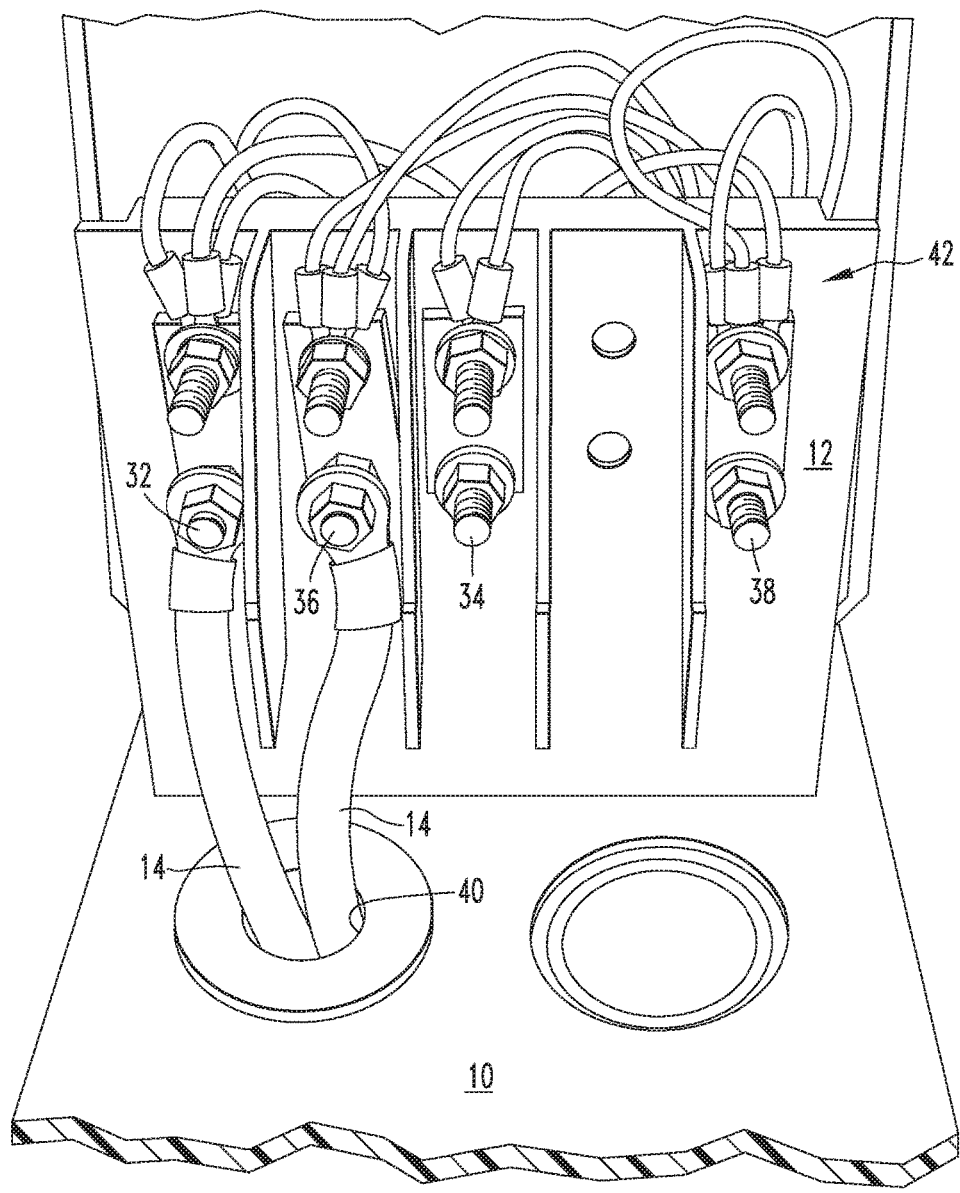
FIG. 2 is an isometric view of the input power terminals of the marina power pedestal of FIG. 1.

Referring to FIG. 2, the input power terminals 12 of the marina power pedestal 2 of FIG. 1 are shown. These terminals 12 include a first line terminal 32 (LINE1), a second line terminal 34 (LINE2), a neutral terminal 36 and a ground terminal 38. As shown by the two example electrical conductors 14, the terminals 32,34,36,38 are structured to be electrically connected to a suitable power source (not shown) by those conductors, which extend through the opening 40. It will be appreciated that the other terminals 34,38 may also be electrically connected to the power source by other electrical conductors (not shown). The other electrical conductors 42 are electrically connected to the circuit breakers 18 and the output power receptacles 16.

Referring to FIG. 3 a schematic diagram of a ground limit indicator circuit is shown. The ground fault indicator circuit includes the input power terminals 12, the output power receptacles 16, the circuit breakers 18 with ground fault capability, a relay 20, and an indicator unit 22.

As previously described, the input power terminals 12 are mounted to the pedestal member 4 and are structured to be electrically connected to a power source (e.g., a utility power source) (not shown). The input power terminals 12 are electrically connected to the output power receptacles 16. In more detail, NEUTRAL and GROUND electrical connections of the input power terminals 12 are electrically connected to the output power receptacles 16 and LINE1 and LINE2 electrical connections of the input power terminals 12 are electrically connected to the output power receptacles 16 via the circuit breakers 18.

The circuit breakers 18 have the capability of detecting a ground fault on the power circuit. When one of the circuit breakers 18 detects a ground fault, it trips open, electrically disconnecting the corresponding output power receptacle from LINE1 or LINE2. The circuit breakers 18 also have an alarm output. In addition to tripping open in response to detecting a ground fault, the circuit breakers 18 output an alarm signal to the relay 20.

The relay 20 is structured to receive the alarm signal from the circuit breakers 18 and, in response to receiving the alarm signal, to output an indicator signal to the indicator unit 22. The indicator unit 22 includes an indicator (e.g., without limitation, a light emitting diode) which is illuminated in response to receiving the indicator signal from the relay 20. In this manner, an indication is provided that the power pedestal 2 is suffering from a ground fault condition.

Referring to FIG. 4 a circuit diagram of the ground fault indicator circuit in accordance with an embodiment of the disclosed concept is shown. In the ground fault indicator circuit of FIG. 4, four output power receptacles 16 are shown. However, the disclosed concept is not limited thereto. Any number of output power receptacles 16 may be used without departing from the scope of the disclosed concept.

The circuit breakers 18 each include one or more sets of separable contacts 51 which, when opened, electrically disconnect the corresponding output power receptacle 16 from LINE1 or LINE2. The circuit breakers 18 each also include an alarm switch 50 which works in conjunction with the separable contacts 51 to output the alarm signal when the separable contacts open.

In the ground fault indicator circuit of FIG. 4, the indicator circuit 22 includes a multicolor light emitting diode (LED) 52 and an LED driver 53. The multicolor LED 52 allows different colors to be output using the same LED. The LED driver 53 controls which color the multicolor LED 52 displays. To this extent, different colors may be used to indicate different statuses or to suit the preferences of the user of the power pedestal 2. In some embodiments of the disclosed concept, the LED driver 53 drives the multicolor LED 52 to blink red when the power pedestal 2 is under a ground fault condition.

In some embodiments of the disclosed concept, the around fault indicator circuit further includes a photocell 54. The photocell 54 provides ambient light detection which can be used to turn off lights on the power pedestal 2 when it is light outside in order to save power.

Figure 5:
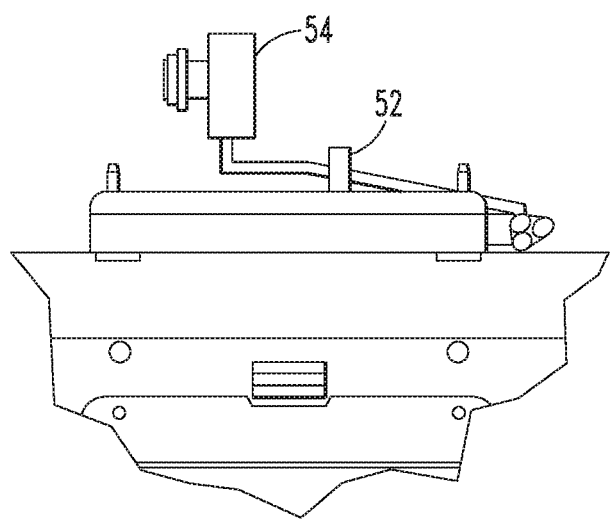
FIG. 5 is a view of the inside of an upper housing of the marina power pedestal of FIG. 1.

FIG. 5 is a cross-sectional view of an upper housing 55 (shown in FIG. 1) of the power pedestal 2. FIG. 5 shows the area inside the power pedestal 2 where the photocell 54 and the multicolor LED 52 are located. Since the multicolor LED 52 is located at a top portion of the power pedestal 2, it is easy to see when it is illuminated. Also, the upper housing of the power pedestal 2 includes transparent or translucent exterior panels so that light from the multicolor LED 52 can be seen from outside the power pedestal 2.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A power pedestal comprising:
   a pedestal member comprising:
      a base structured to be fixed to a platform, and
      an enclosure extending from said base;
   a plurality of input power terminals mounted to said pedestal member and structured to be electrically connected to a power source;
   a number of output power receptacles mounted to said enclosure;
   a plurality of circuit interrupters having a ground fault detection capability and being structured to output an alarm signal in response to detecting a ground fault;
   a relay structured to receive the alarm signal from any of the plurality of circuit interrupters and to output an indicator signal in response to receiving the alarm signal from at least one of the plurality of circuit interrupters; and
   an indicator unit structured to receive the indicator signal from the relay, the indicator unit including an indicator and being structured to illuminate the indicator in response to receiving the indicator signal.

2. The power pedestal of claim 1, wherein the indicator unit includes a light emitting diode.

3. The power pedestal of claim 1, wherein the indicator unit includes a multicolor light emitting diode and a light emitting diode driver structured to drive the multicolor light emitting diode.

4. The power pedestal of claim 3, wherein the light emitting diode driver is structured to drive the multicolor light emitting diode to illuminate in red in response to receiving the indicator signal.

5. The power pedestal of claim 4, wherein the light emitting diode driver is structured to drive the multicolor light emitting diode to blink in red in response to receiving the indicator signal.

6. The power pedestal of claim 1, wherein the indicator is disposed in an upper housing of the power pedestal.

7. The power pedestal of claim 6, wherein the upper housing includes transparent or translucent panels.

8. The power pedestal of claim 1, further comprising a photocell structured to detect ambient light.

9. The power pedestal of claim 1, wherein the power pedestal includes four output power receptacles.

10. The power pedestal of claim 1, wherein the input power terminals include a first line terminal, a second line terminal, a neutral terminal, and a ground terminal.

11. The power pedestal of claim 10, wherein the number of circuit interrupters are each electrically connected between the first line terminal and at least one of the power receptacles or the second line terminal and at least one of the output power receptacles.

* * * * *